(12) United States Patent
Kano et al.

(10) Patent No.: US 7,121,451 B2
(45) Date of Patent: Oct. 17, 2006

(54) FRICTION STIR WELDING METHOD AND FRICTION STIR WELDING DEVICE

(75) Inventors: Yuzo Kano, Kobe (JP); Mitsuo Fujimoto, Kobe (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 0 days.

(21) Appl. No.: 10/843,360

(22) Filed: May 12, 2004

(65) Prior Publication Data
US 2005/0029331 A1    Feb. 10, 2005

(30) Foreign Application Priority Data
May 14, 2003    (JP)    ............... 2003-135764

(51) Int. Cl.
*B23K 31/02*    (2006.01)
(52) U.S. Cl. ................................... 228/112.1
(58) Field of Classification Search ............. 228/112.1, 228/2.1
See application file for complete search history.

(56) References Cited

U.S. PATENT DOCUMENTS

| 6,213,379 | B1 | 4/2001 | Takeshita et al. |
| 6,247,633 | B1 | 6/2001 | White et al. |
| 6,421,578 | B1 * | 7/2002 | Adams et al. ............... 700/212 |
| 6,497,355 | B1 | 12/2002 | Ding et al. |
| 6,601,751 | B1 * | 8/2003 | Iwashita ................... 228/112.1 |
| 6,843,405 | B1 * | 1/2005 | Okamoto et al. ......... 228/112.1 |
| 2003/0098335 | A1 * | 5/2003 | Saeki et al. .............. 228/112.1 |

FOREIGN PATENT DOCUMENTS

| EP | 1 279 459 A2 | 1/2003 |
| JP | A 2001-314982 | 11/2001 |
| JP | A 2001-314983 | 11/2001 |
| JP | A 2002-292480 | 10/2002 |
| JP | A 2003-135764 | 5/2003 |
| JP | B1 3498086 | 11/2003 |

* cited by examiner

*Primary Examiner*—Jonathan Johnson
(74) *Attorney, Agent, or Firm*—Oliff & Berridge, PLC

(57) ABSTRACT

A welding tool is inserted into an object in a rotation-stopped state, and the welding tool is rotated after insertion, thereby the object is stirred by frictional heat. The welding tool is inserted into the object free of whirling. The welding tool can be prevented from inserting in a position shifted from the target welding position. Namely, the welding tool is precisely inserted in the target welding position and members of the object can be welded in the target welding position free of shifting.

6 Claims, 11 Drawing Sheets

FRICTION STIR WELDING METHOD AND FRICTION STIR WELDING DEVICE

BACKGROUND OF THE INVENTION

1. Field of the Invention

The present invention relates to a friction stir welding method and a friction stir welding device for welding an object composed of a plurality of members to be welded by stirring the object in a solid phase 2. Description of the Related Art As a conventional method of welding a plurality of members to be welded, a friction stir welding method is available. In the conventional friction stir welding, a welding tool is arranged on one side of an object whose members to be welded are stacked. Next, the welding tool is rotated and pressed against the object so as to be inserted into the object. The welding tool makes the members to be welded partially fluid in the non-molten state by frictional heat and stirs the fluidized members so as to weld the members, as disclosed in, for example, Japanese Patent Laid-Open Publication No. 2001-314983.

In the conventional friction stir welding method, the welding tool is rotated and then inserted into an object. However, when a welding device is low in its accuracy and rigidity, the rotating tip of the welding tool is shifted from the precise position, causing the so-called whirling. In this case, the welding tool is inserted into the object at a position out of the target welding position which is originally planed. As a result, a problem arises that the welding tool cannot be inserted precisely into the target welding position.

Further, there is a case that a plurality of parts of the members to be welded are sequentially spot-welded. As mentioned above, in the conventional friction stir welding method, the insertion position of the welding tool may be shifted from the target welding position. Therefore, the interval of actual insertion positions cannot be set to a predetermined interval, thereby, a problem arises that the welding strength may be varied. Further, when the variation between the target welding position and the actual insertion position is large, the welding strength may be decreased. Further, since the actual insertion position is shifted from the target welding position, the beauty of the welded object may be deteriorated.

SUMMARY OF THE INVENTION

Therefore, an object of the present invention is to provide a friction stir welding method and device for precisely inserting the welding tool in the target welding position set in an object.

According to one aspect of the present invention, a friction stir welding method of welding an object composed of a plurality of members to be welded by stirring the object in a solid phase using a welding tool, comprises: an insertion step of moving the welding tool in a reference direction coinciding with an axis of the welding tool in a rotation-stopped state so as to insert the welding tool into the object; and a stirring step of rotating the welding tool about the axis of the welding tool after the insertion step so as to stir the object in a solid phase by frictional heat between the welding tool and the object, thereby welding the members.

According to the present invention, the welding tool is inserted into the object in the rotation-stopped state, and the welding tool is rotated after insertion, thus the object is friction-stirred. The welding tool is inserted into the object free of whirling, so that the welding tool can be prevented from inserting into a position shifted from the target welding position. When the welding tool is inserted in the target welding position of the object, a concavity into which the welding tool is fit is formed. The welding tool is rotated in the state that it is fit into the concavity, thereby can weld the members to be welded at the target welding position without shifting from the target welding position.

By doing like this, the insertion position can be prevented from variations for each object and the welding quality of the welded objects can be made uniform. Further, the welding tool can be inserted precisely in the target welding position, so that the beauty of the welded object can be prevented from deteriorating.

Preferably, the friction stir welding method further comprises a pull-out step of moving the welding tool in the reference direction in the rotation-stopped state so as to separate the welding tool from the object.

According to the present invention, at the insertion step and the pull-out step, the welding tool is not rotated. It is enough to rotate the welding tool at the stirring step to weld the object to be welded. According to the present invention, to perform the friction stir welding, the welding tool is rotated at the stirring step requiring rotation of the welding tool. By doing like this, the rotation time of the welding tool can be shortened and the welding energy required for the welding operation can be reduced, while maintaining the required welding strength. Thereby, the manufacturing cost can be reduced. Particularly, when a plurality of parts of an object are to be sequentially spot-welded, the welding energy can be reduced remarkably.

Preferably, in the friction stir welding method, a plurality of parts of the members to be welded are sequentially spot-welded.

According to the present invention, the welding tool is precisely inserted into the target welding position without whirling as mentioned above. As a result, the interval of insertion positions of the welding tool can be set to a predetermined interval. Therefore, the interval of insertion positions of the welding tool can be prevented from variations. As a result, the welding strength can be prevented from variations for each object and a uniform welding strength can be realized for each object, while maintaining the required welding strength. Further, the insertion positions are lined up free of shifting from the target welding positions, thus the beauty of the welded object can be prevented from deteriorating.

Preferably, in the insertion step, it is judged that the welding tool makes contact with the object when a pressure applied to the object by the welding tool becomes larger than a predetermined pressure and/or when a position of the welding tool reaches a predetermined position coinciding with a surface of the object.

Preferably, the stirring step starts rotating of the welding tool when a predetermined time elapses after the welding tool makes contact with the object and/or when the welding tool moves by a predetermined distance after making contact with the object.

According to another aspect of the present invention, a friction stir welding device for welding an object composed of a plurality of members to be welded by stirring the object in a solid phase using a welding tool, comprises: a tool holding part configured to hold the welding tool, the tool holding part being installed rotatably about a predetermined reference axis; rotation driving means for rotating the tool holding part about the reference axis; movement driving means for moving the tool holding part in the reference axis; insertion decision means for deciding that the welding tool is inserted into the object to be welded; and control means for controlling the rotation driving means and the movement driving means so as to move the welding tool in a rotation-stopped state in the reference axis coinciding with an axis of the welding tool, and when the welding tool is judged to be inserted into the object to be welded based on a decision of the insertion decision means, rotate the welding tool about the axis.

According to the present invention, the control means moves the welding tool in the rotation-stopped state toward the object to be welded. When the control means, on the basis of the decision of the insertion decision means, judges that the welding tool is inserted into the object, it rotates the welding tool and friction-stirs the object. Accordingly, the welding tool is inserted into the object free of whirling, so that the welding tool is prevented from being inserted into a position shifted from the target welding position. When the welding tool is inserted in the target welding position of the object, a concavity to be fit into the welding tool is formed. The welding tool is rotated in the state that it is fit into the concavity, so that it can weld the members to be welded at the target welding position without being shifted from the target welding position.

By doing like this, the insertion position can be prevented from variations for each object and the welding quality of objects can be made uniform. Further, the welding tool can be inserted precisely in the target welding position, so that the beauty of the welded object can be prevented from deteriorating.

Preferably, in the friction stir welding device, the rotation driving means includes a servo motor.

According to the present invention, the control means controls the rotation of the servo motor to control the rotation of the welding tool. The servo motor can reach the target revolution speed in a short time. Therefore, even if the welding tool is rotated after the welding tool is inserted, the servo motor can reach the required revolution speed in a short time, thus, the welding efficiency can be prevented from reducing.

Preferably, the control means judges that the welding tool makes contact with the object when a pressure applied to the object by the welding tool becomes larger than a predetermined pressure and/or when a position of the welding tool reaches a predetermined position coinciding with a surface of the object.

Preferably, the control means starts rotating of the welding tool when a predetermined time elapses after the welding tool makes contact with the object and/or when the welding tool moves by a predetermined distance after making contact with the object.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1:
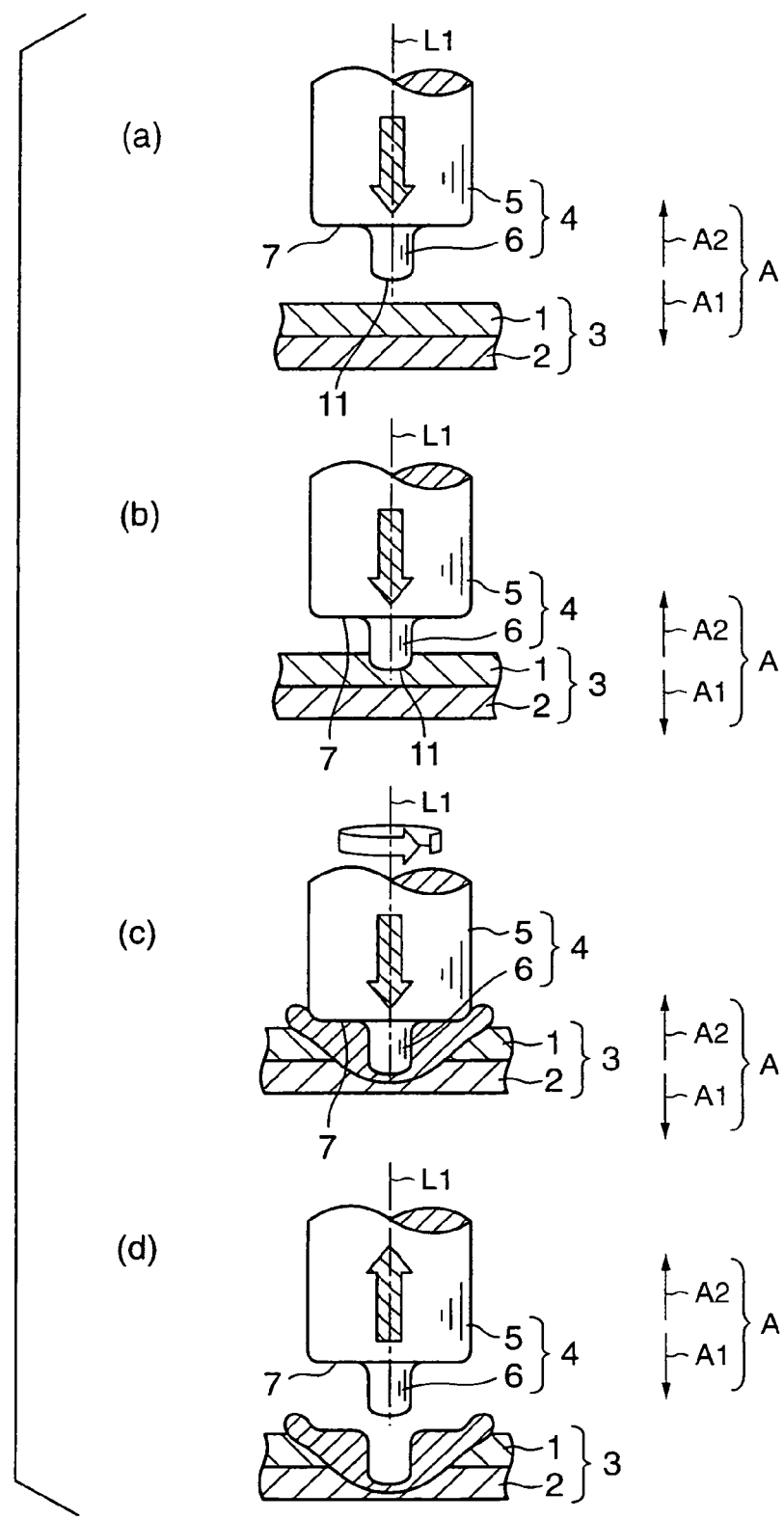
FIG. 1 is a sectional view showing states of a welding tool 4 to explain a welding procedure of a friction stir welding method of an embodiment of the present invention.

The welding procedure of the friction stir welding method of an embodiment of the present invention is performed in the order from FIG. 1(a) to FIG. 1(d). The friction stir welding (abbreviated to FSW) welds a plurality of members 1 and 2 formed as an object 3. For example, the friction stir welding method is used for sport welding to locally weld the members 1 and 2 using a friction stir welding device 50 shown in FIG. 2 which will be described later.

The friction stir welding is performed using a cylindrical welding tool 4. The welding tool 4 has a main portion 5 formed almost in a columnar shape and a pin 6 formed almost in a columnar shape which is projected in a first direction A1 of the axis direction A. The main portion 5 has a shoulder face 7 which is an end face in the first direction A1 of the axis direction A. The shoulder face 7 is formed almost perpendicularly to the axis L1 of the welding tool 4. The pin 6 is projected perpendicularly from the shoulder face 7. The main portion 5 and the pin 6 are formed coaxially and the structure of the pin 6 is formed smaller than the structure of the main portion 5. Further, the tip of the pin 6 is preferably formed in a convex shape so as to be easily inserted into the object 3.

The welding tool 4 is inserted into the object 3 and then rotated with being in contact with the object 3 to weld the members 1 and 2 of the object 3. By doing this, the object 3 is fluidized by frictional heat and the fluidized part is stirred. The fluidized members 1 and 2 of the object 3 are mutually mixed. Thereafter, the fluidized part is hardened, thus the members 1 and 2 are welded with each other. The members 1 and 2 are, for example, made of an aluminum alloy.

Figure 2:
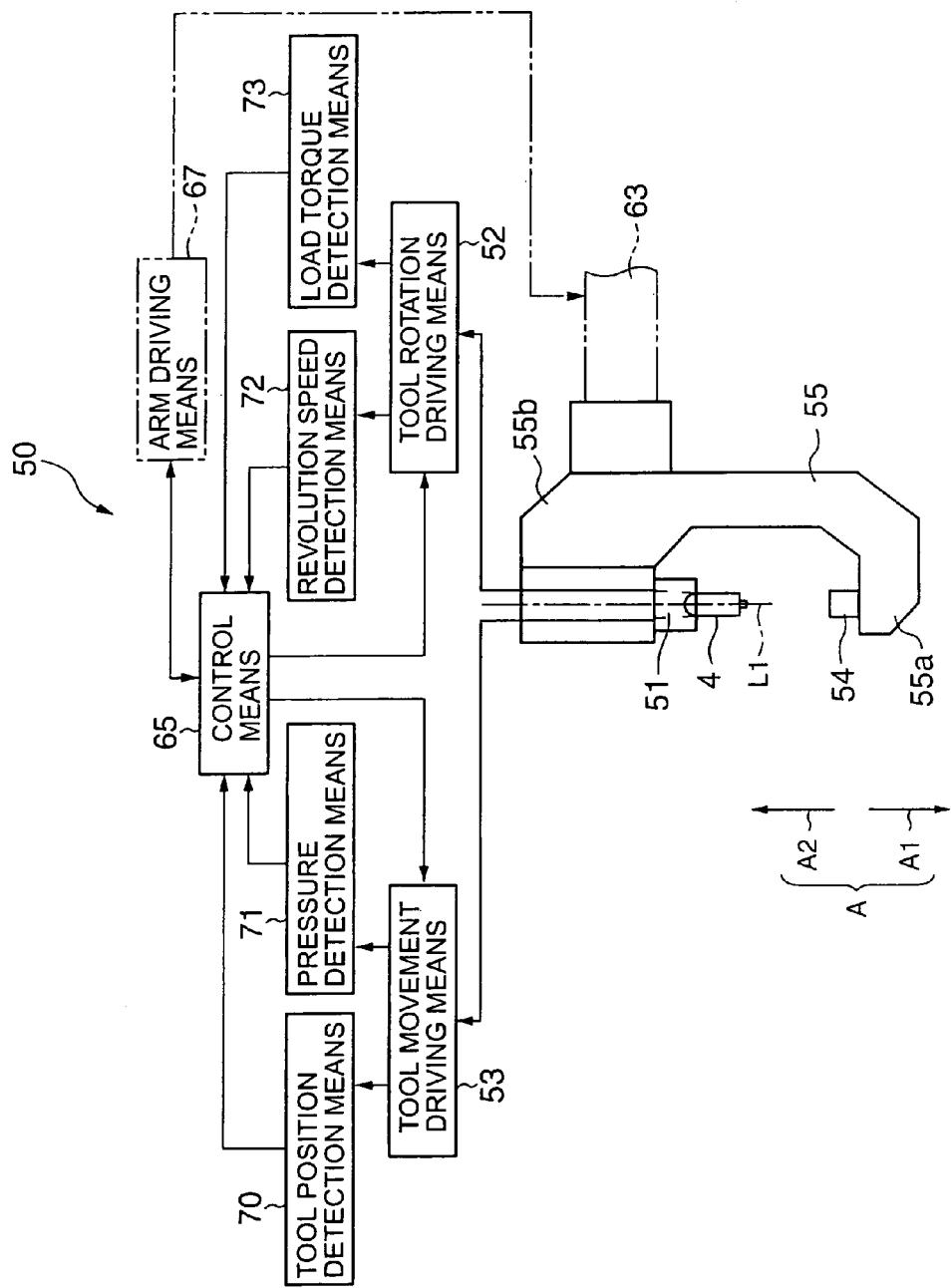
FIG. 2 is a block diagram showing a simplified friction stir welding device 50.

FIG. 2 is a block diagram showing the simplified friction stir welding device 50 of an embodiment according to the present invention. The friction stir welding device 50 (hereinafter just referred to as the welding device 50) is a device for performing the friction stir welding. The friction stir welding device 50 is used, for example, to weld a car body panel to be pressed. Further, the friction stir welding device 50 is used for continuous welding of performing spot welding for the object 3 several times.

The welding device 50 is equipped with the aforementioned welding tool 4. The welding device 50 has a reference axis which is preset. The welding tool 4 is mounted to the welding device 50 so that the axis L1 thereof-coincides with the reference axis.

At this time, the axis L1 of the welding tool 4 and the reference axis of the welding device 50 are coaxial. Therefore, the reference axis of the welding device 50 is indicated by the same reference symbol L1 as the axis of the welding tool 4. Further, the reference direction along the reference axis L1 and the axis direction A of the welding tool 4 coincide with each other. Therefore, the reference direction is assigned the same reference symbol A as the axis direction of the welding tool 4. The first direction A1 of the reference direction A is the direction from a tool holding part 51 to a support 54 and a second direction A2 of the reference direction A is opposite to the first direction A1 of the axis direction A.

The welding device 50 is composed of the tool holding part 51, a tool rotation driving means 52, a tool movement driving means 53, the support 54, and a base 55. The tool holding part 51 removably holds the welding tool 4. The tool rotation driving means 52 rotates the tool holding part 51 about the reference axis L1. The tool movement driving means 53 moves the tool holding part 51 in the reference direction A.

The driving means 52 and 53 include servo motors respectively. In the servo motors, a current, which is supplied so as to obtain a predetermined revolution speed, is feedback-controlled. The servo motors can reach the target revolution speed in a short time, for example, about 0.1 seconds.

The support 54 is installed in a position opposite to the tool holding part 51 in the reference direction A and supports the object 3 from the opposite side to the welding tool 4. The base 55 is connected to the tip of a robot arm 63 and supports the tool holding part 51, the driving means 52 and 53, and the support 54 directly or indirectly. The robot arm 63 is realized by a robot represented by a 6-axis multi-joint robot.

The base 55 is moved by the robot arm 63. Further, the base 55 is the so-called C gun and is formed almost in a C shape. The support 54 is installed at one end 55a of the base 55 formed in a C shape in the circumferential direction. Further, the tool holding part 51 is installed at the other end 55b of the base 55 formed in a C shape in the circumferential direction.

The welding device 50 has a tool position detection means 70 for detecting the position of the welding tool 4 and a pressure detection means 71 for detecting the tool pressure given to the object 3 by the welding tool 4. The tool position detection means 70 and the pressure detection means 71 function as a contact state detection means for detecting the contact of the welding tool 4 with the object 3.

The tool position detection means 70 is realized by an encoder installed in the servo motor for moving the tool. The pressure detection means 71 detects a current proportional to the tool pressure of the servo motor for moving the tool. On the basis of this current, the tool pressure is inferred.

Further, the welding device 50 has a revolution speed detection means 72 for detecting the revolution speed of the welding tool 4 and a load torque detection means 73 for detecting the tool load torque necessary for rotation of the welding tool 4. The revolution speed detection means 72 is realized by an encoder installed in the servo motor for rotating the tool. Further, the load torque detection means 73 detects a current proportional to the tool load torque of the servo motor for rotating the tool. On the basis of this current, the tool load torque is inferred.

Further, the welding tool 50 includes a control means 65. The control means 65 controls the rotation driving means 52 and the movement driving means 53. The control means 65 is given signals indicating detection results from the pressure detection means 71, the revolution speed detection means 72, and the load torque detection means 73. In this embodiment, the control means 65 controls a robot arm driving means 67 for driving the robot arm 63 and functions as a robot controller. Further, the control means 65 functions as an insertion decision means for judging that the welding tool 4 is inserted into the object 3.

Figure 3:
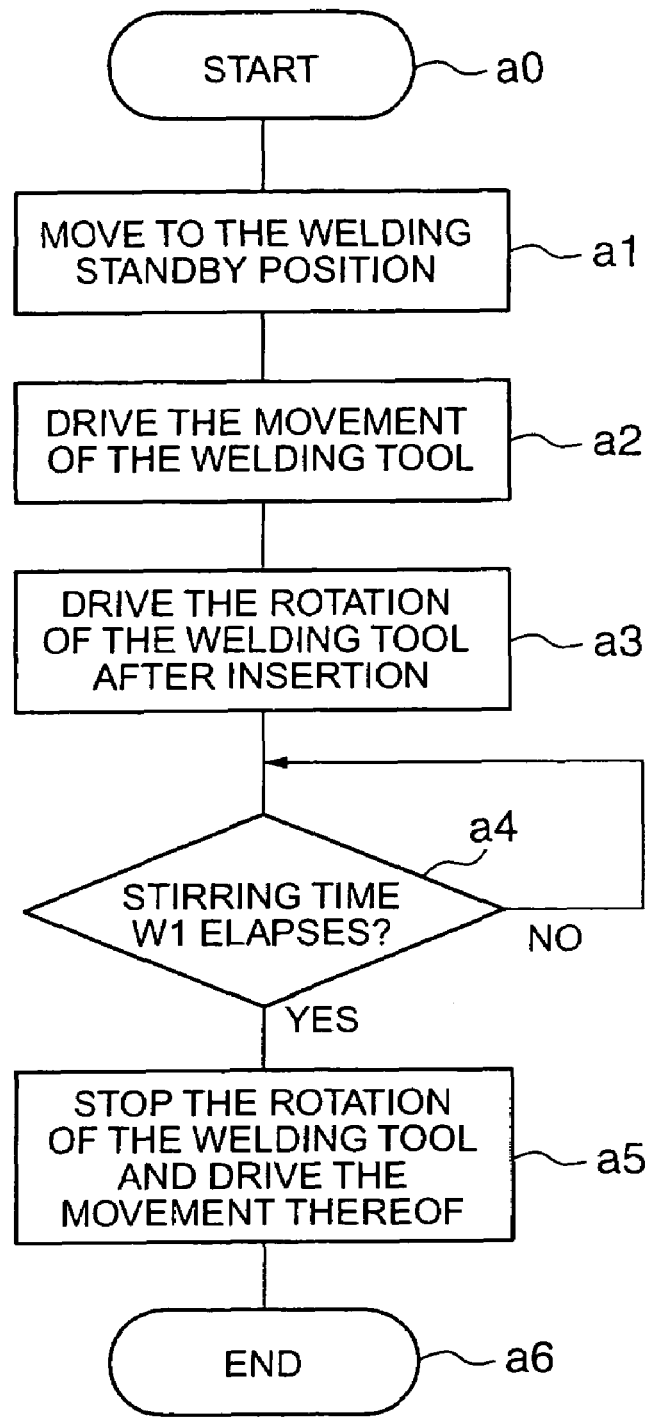
FIG. 3 is a flow chart showing an operation procedure of the friction stir welding method.

FIG. 3 is a flow chart showing the operation procedure of the friction stir welding method of the present invention. Referring to FIGS. 1 and 3, the friction stir welding method will be explained. Firstly, at Step a0, an operator mounts the welding tool 4 on the tool holding part 51. Further, the object 3 is held at a predetermined holding position. When such a welding preparation is completed, the process goes to Step a1 and the control means 65 starts the welding operation.

At Step a1, the control means 65 controls the robot arm driving means 67 and moves the base 55 to a predetermined welding standby position by the robot arm 63. When the base 55 is arranged at the welding standby position, the welding tool 4 is arranged at an interval with respect to a preset target welding position set in the object 3 in the reference direction A. Further, the support 54 makes contact with the object 3 from the opposite side to the welding tool 4. When the welding tool 4 is moved to the welding standby position like this, the process goes to Step a2.

At Step a2, the control means 65 controls the movement driving means 53 and moves the tool holding part 51 in the first direction A1 of the reference direction A. By doing this, as shown in FIG. 1(a), the welding tool 4 moves in the direction A1 approaching the object 3. At this time, the control means 65 controls the rotation driving means 52 and moves the tool holding part 51 in the rotation-stopped state. When the welding tool 4 moves toward the support 54, as shown in FIG. 1(b), it makes contact with the object 3 and is inserted into the object 3. When the welding tool 4 is inserted into the object 3, the process goes to Step a3.

At Step a3, the control means 65 judges that the welding tool 4 is inserted into the object 3. The control means 65, after the welding tool 4 is inserted into the object 3, controls the rotation driving means 52 and rotates the tool holding part 51. The welding tool 4, after being inserted into the object 3, rotates with being contact with the object 3 to perform the so-called friction stirring as shown in FIG. 1(c), and the process goes to Step a4.

In this embodiment, when the control means 65, on the basis of the detection result of the pressure detection means 71, decides that the tool pressure becomes larger than a predetermined pressure, it judges that the welding tool 4 makes contact with the object 3. Alternatively or additionally, when the control means 65, on the basis of the detection result of the tool position detection means 70, decides that the tool position reaches a predetermined surface position of the object 3, it judges that the welding tool 4 makes contact with the object 3.

And, the control means 65, when a predetermined first set time W2 elapses after it judges that the welding tool 4 makes contact with the object 3, judges that the welding tool is inserted into the object 3 and then starts rotation of the welding tool 4.

At Step a4, the control means 65 decides whether a predetermined stirring time W1 elapses after the welding tool 4 makes contact with the object 3. When the stirring time W1 elapses, the process goes to Step a5 and when the stirring time W1 does not elapse, the control means 65 continues the friction stirring by the welding tool 4.

At Step a5, the control means 65 controls the movement driving means 53 and moves the tool holding part 51 in the second direction A2 of the reference direction A. By doing this, as shown in FIG. 1(d), the welding tool 4 moves in the direction A2 separating from the object 3. Further, the control means 65 controls the rotation driving means 52 and stops the rotation of the tool holding part 51. When the control means 65 moves the welding tool 4 to the welding standby position and stops the rotation of the tool holding part 51, the process goes to Step a6 and the control means 65 finishes the welding operation.

The revolution speed of the welding tool 4 is a predetermined speed. The predetermined revolution speed may be constant or changed with time. Further, before the stirring time W1 elapses after the welding tool 4 makes contact with the object 3, the welding tool 4 gives a predetermined pressure to the object 3. The predetermined pressure may be constant or changed with time.

Figure 4:
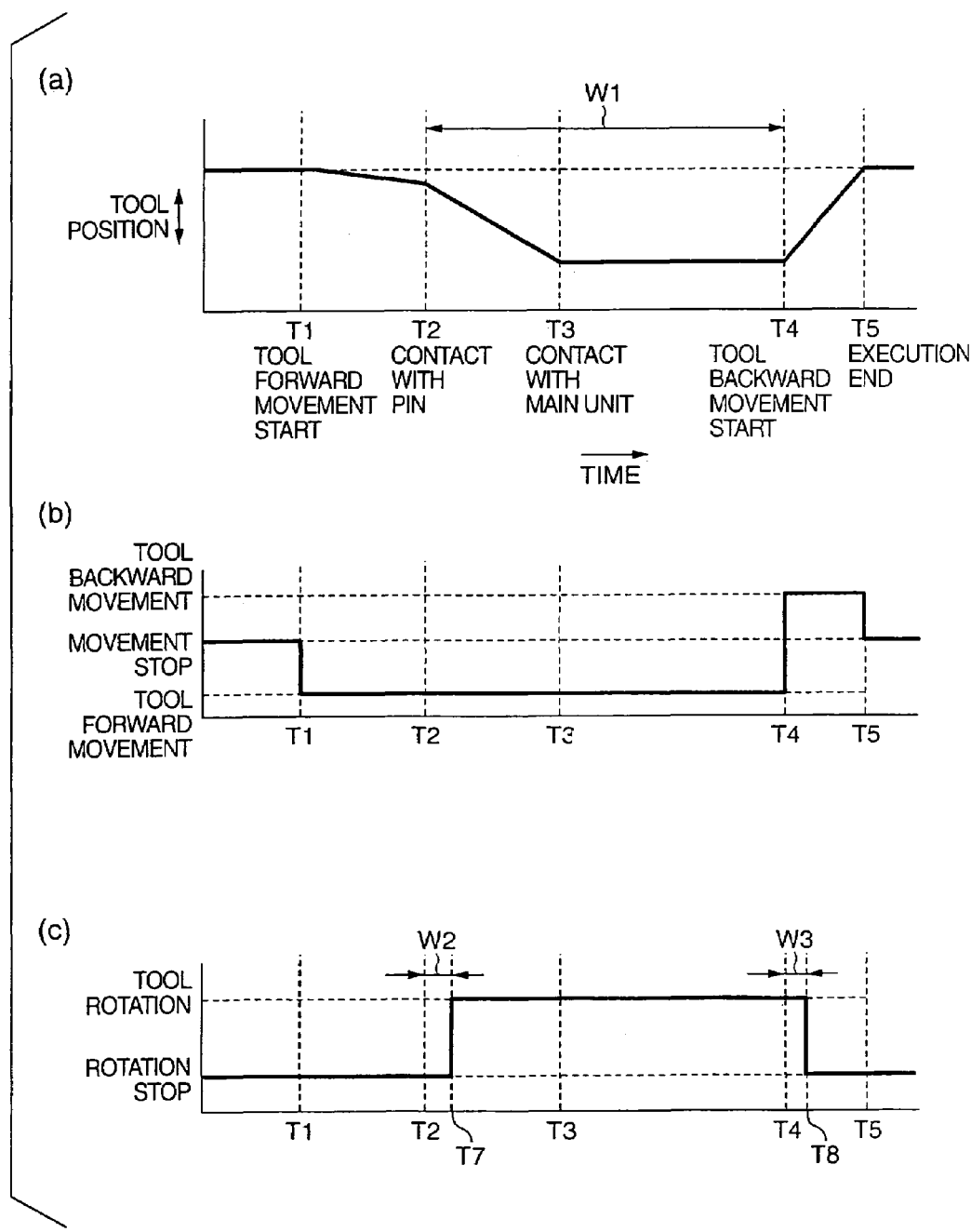
FIG. 4 is a timing chart showing time relationships between the position of the welding tool 4 and the states of the welding tool 4.

FIG. 4 is a timing chart showing the time relationship between the position of the welding tool 4 and the state of the welding tool 4. FIG. 4(a) shows the movement position of the welding tool 4, and FIG. 4(b) shows the movement state of the welding tool 4, and FIG. 4(c) shows the rotation state of the welding tool.

When the movement driving means 53 is controlled at Step a2 as mentioned above, the welding tool 4 moves in the direction A1 approaching the object 3 as the time elapses after a first time T1. At a second time T2, an end face 11 of the pin 6 collides with the surface of the object 3 in the rotation-stopped state and the tip of the pin 6 is inserted into the object 3. By doing this, in the object 3, a concavity is formed. The tip of the pin 6 is fit into the concavity. The welding tool 4, even if the tip of the welding tool 4 is inserted into the object 3, is additionally driven to move in the first direction A1 of the reference direction A.

The welding tool 4, when a predetermined first set time W2 elapses after the second time T2 and/or when the welding tool 4 moves by a predetermined distance after making contact with the object 3, starts rotation at a rotation start time T7. The welding tool 4, after the rotation start time T7, is rotated and inserted into the object 3 and at a third time T3, the shoulder face 7 makes contact with the object 3. After the third time T3, the welding tool 4 hardly moves in the first direction A1 of the reference direction and friction-stirs the object 3.

Concretely, the shoulder face 7 slides on the object 3 and the object 3 is softened and fluidized by frictional heat with the welding tool 4. Further, by the rotation of the pin 6, the fluidized part of the object 3 is stirred and the fluidized members 1 and 2 of the object 3 are mutually mixed.

The welding tool 4, until the time reaches the predetermined stirring time W1 after the second time T2, continues the sliding rotation for the object 3. When the stirring time W1 elapses and the time reaches a fourth time T4, the welding tool 4 moves in the direction A2 separating from the object 3 and returns to the welding standby position at a fifth time T5. The welding tool 4 is separated from the object 3, and then the fluidized parts of the members 1 and 2 are hardened, thus the members 1 and 2 are welded.

The stirring time W1 is set to a time of sufficiently fluidizing and stirring the object 3, for example, set to 1.4 seconds. When the welding tool 4 is rotated until the stirring time W1 elapses, the softened object 3 is sufficiently fluidized and stirred, and members 1 and 2 can be mixed.

The rotation start time T7 for rotating the tool holding part 51 may be any time after the second time T2 when the welding tool 4 makes contact with and is inserted into the object 3. In this embodiment, the welding tool 4 is rotated after the predetermined set time W2 elapses after the second time T2. Further, the welding tool 4 starts rotation before the shoulder face 7 makes contact with the object 3. For example, the first set time W2 is set between 0.01 seconds and 0.20 seconds. Further, for example, when the insertion speed of the welding tool 4 into the object 3 is known, the first set time W2 is set to the time which is shorter than the insertion time of the welding tool 4 determined by the length of the pin 6 in the direction of the axis. By doing this, the welding tool 4 can surely start rotation before the shoulder face 7 makes contact with the object. For example, the first set time W2 is set to the time that the tip of the welding tool 4 is inserted into the object 3 between 0.3 mm and 0.5 mm.

Further, a rotation stop time T8 for stopping the rotation of the tool holding part 51 may be any time after the fourth time T4. Further, the rotation stop time T8 is preferably before the fifth time T5 at which the operation ends. In this embodiment, the welding tool 4 stops the rotation after the predetermined second set time W3 elapses after the fourth time T4. For example, the second set time W3 is set between 0.01 seconds and 0.20 seconds. The control means 65 controls the driving means 52 and 53 so as to operate the welding tool 4 as mentioned above.

Figure 5:
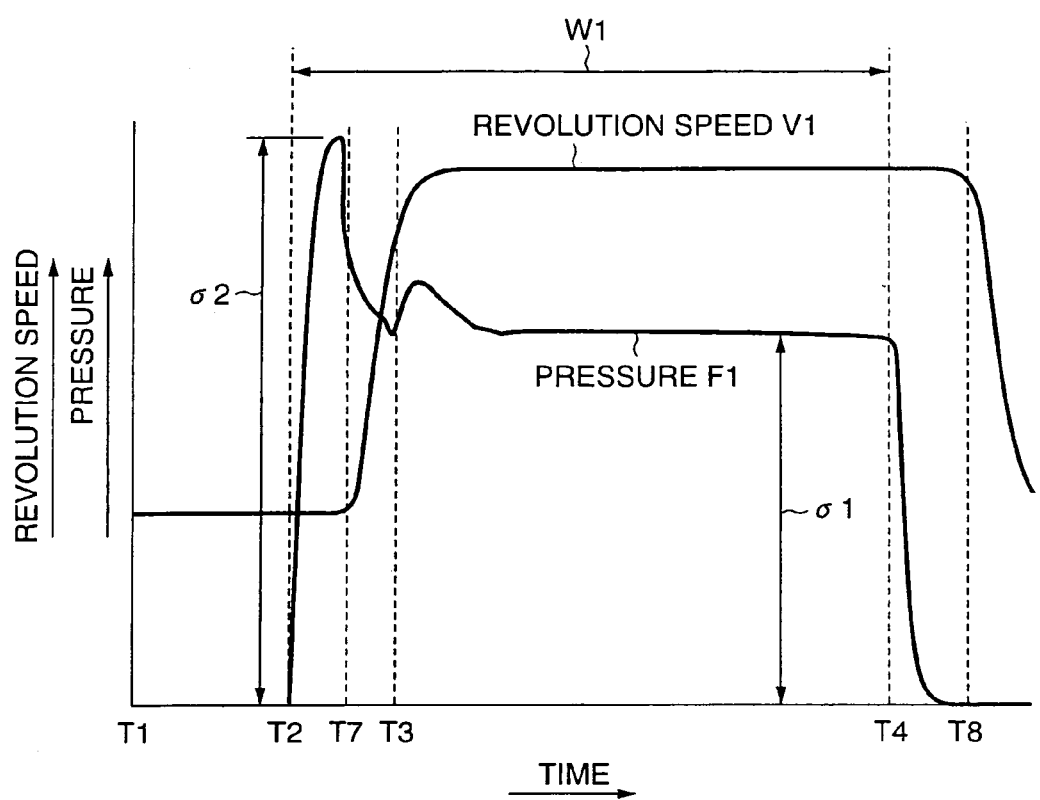
FIG. 5 is a graph showing changes with time of a revolution speed V1 and a pressure F1 of the welding tool 4 in the friction stir welding of the present embodiment.

FIG. 5 is a graph showing changes with time of the revolution speed V1 of the welding tool 4 and the pressure F1 applied to the object 3 by the welding tool 4 in this embodiment. Further, FIG. 6 is a graph showing changes with time of the revolution speed V2 of the welding tool 4 and the pressure F2 applied to the object 3 by the welding tool 4 in a comparison example.

The welding tool 4 is set so as to pressure the object 3 at a predetermined pressure. However, when the welding tool 4 makes contact with the object 3 at the second time T2, the pressure applied to the object 3 is instantaneously increased.

In the friction stir welding method of the present embodiment according to the present invention, the welding tool 4 makes contact with the object 3 in the rotation-stopped state and applies an instantaneous pressure σ2 higher than a predetermined pressure σ1 to the object 3. And, the welding tool 4 forms a concavity where the tip of the pin 6 is inserted on the object 3. The welding tool 4 is inserted into the object 3 in the non-whirling state, so that it can make a concavity at a preset target welding position. In the state that the pin 6 is fit into the concavity, the welding tool 4 starts rotation.

Figure 6:
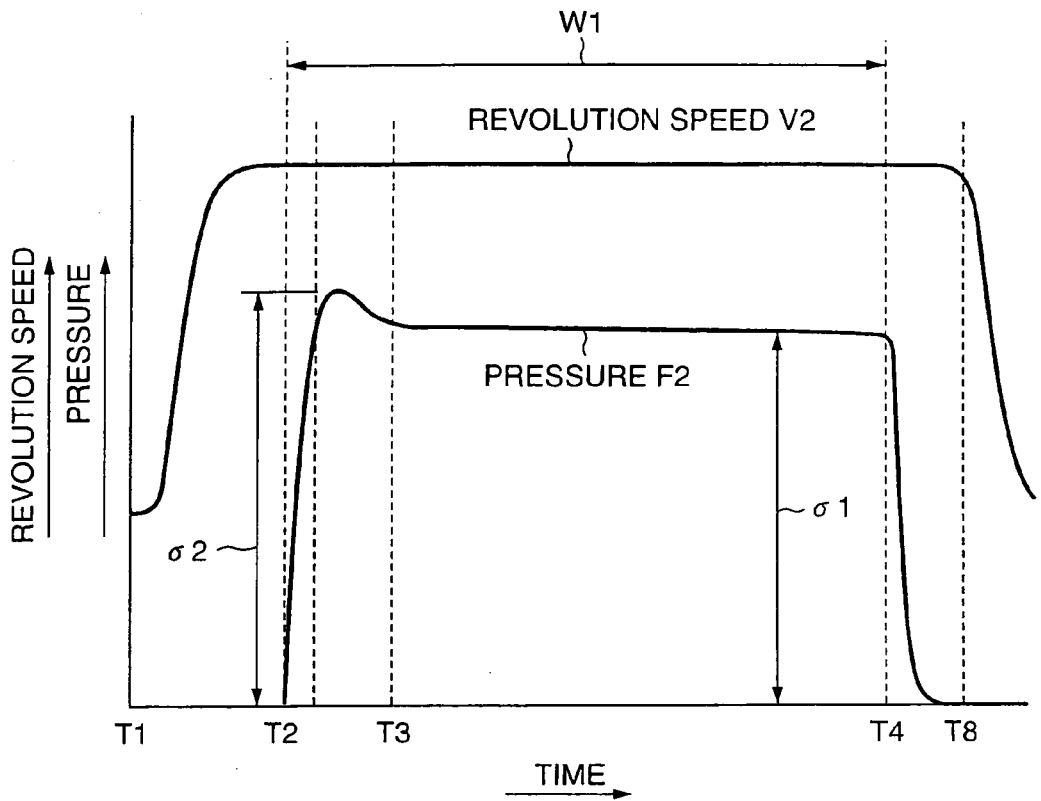
FIG. 6 is a graph showing changes with time of a revolution speed V2 and a pressure F2 of a welding tool in a friction stir welding of a comparison example.

On the other hand, in the friction stir welding method in the comparison example shown in FIG. 6, the welding tool 4 collides with the object 3 in the rotation state. The tip of the pin 6 collides with the object 3 in the whirling state, so that the welding tool 4 may make a concavity in a position shifted from the preset target welding position. Further, when the surface of the object 3 is curved and the welding tool 4 is rotated and inserted, the welding tool 4 may be shifted from the target welding position. In such a case, the welding tool 4 is inserted into a position different from the target welding position. Further, the instantaneous large pressure σ2 for making a concavity in the target welding position is not applied to the object 3.

As mentioned above, according to the friction stir welding method in this embodiment, the welding tool 4 is inserted into the object 3 in the rotation-stopped state, so that a concavity where the pin 6 is fit can be formed in the target welding position free of shifting. And, the welding tool 4, in the state that the pin 6 is fit into the concavity, rotates and friction-stirs the object 3.

As mentioned above, the welding tool 4 rotates in the state that it is fit into the concavity precisely formed in the target welding position of the object 3. The concavity formed in the object 3 plays like a center-punched hole in a drilling process and the welding tool 4 can be precisely inserted in the target welding position. By doing this, the welding member 1 and 2 can be welded at the target welding position.

For example, even when the surface of the object 3 is curved, the welding tool 4 applies the instantaneous large pressure σ 2 for making a concavity to the object 3, thus the concavity is prevented from shifting from the target welding position and the concavity can be formed deep. By doing this, even when the object 3 is curved, the welding tool 4 can be prevented from shifting from the target welding position.

Further, if the welding tool 4 is inserted into the object 3 in the rotation state, the welding tool 4 may be applied with reaction force perpendicular to the reference axis L1 and shifted from the target welding position. However, in the present embodiment, since the welding tool 4 is inserted into the object 3 in the rotation-stopped state, the welding tool 4 is not applied with reaction force perpendicular to the reference axis L1 and can be prevented from shifting perpendicularly to the reference axis L1.

Further, in the present embodiment, since the tip of the pin 6 is formed in a convex shape, a concavity can be formed easily. Further, since the welding tool 4 is rotated after the pin 6 is inserted into the object 3 and before the shoulder face 7 makes contact with the object 3, compared with the case that the rotation is started after the shoulder face 7 makes contact, the resistance given at the start of rotation can be reduced. Further, in the friction stir welding method of the present invention, the support 54 makes contact with the object 3 and supports the same from the opposite side to the welding tool 4. Therefore, even if the welding tool 4 instantaneously applies a large pressure to the object 3, the object 3 can be prevented from deformation.

Further, in the present embodiment, the welding tool 4 is not rotated in the insertion step of inserting the welding tool 4 into the object 3, and the welding tool 4 is rotated in the stirring step which requires rotation of the welding tool 4 for friction stir welding. By doing this, the rotation time of the welding tool 4 can be shortened and the energy consumed for welding can be reduced, while keeping the required welding strength.

Furthermore, in the present embodiment, in the separation step of separating the welding tool 4 from the object 3, the rotation of the welding tool 4 is stopped after the predetermined second set time W3 elapses after the fourth time T4, so that the energy consumed for welding can be further reduced. Preferably, the rotation of the welding tool 4 is stopped at the fourth time T4.

Further, the control means 65 controls the rotation of the servo motor to control the rotation of the welding tool 4. The servo motor can reach the target revolution speed in a short time. By doing this, even when the welding tool 4 is rotated after the welding tool 4 is inserted into the object 3, the welding tool 4 can reach the revolution speed, at which the required welding strength can be realized, in a short time. By doing this, the welding efficiency can be improved.

Further, when the control means 65 decides, on the basis of changes of the pressure applied to the object 3, whether the welding tool 4 makes contact with the object 3 or not, it can judge surely that the welding tool 4 makes contact with the object 3. For example, even when the object 3 is varied in the plate thickness, the control means 65 can decide that the welding tool 4 makes contact with the object 3.

Further, when the control means 65 decides on the basis of changes of the tool position whether the welding tool 4 makes contact with the object 3 or not, the welding tool 4 can start rotation when the welding tool 4 reaches a predetermined insertion amount. By doing this, the welding tool 4 can be inserted into the object 3 neither too much nor too little. Further, by referring to changes of the tool position, the welding tool 4 can be inserted into the object 3, while confirming the residual plate thickness which is the distance between the surface of the object 3 on the support side and the tip of the welding tool 4. By doing this, the welding tool 4 can be prevented from piercing through the object 3 and the welding quality can be improved.

As mentioned above, the control means 65, on the basis of at least either of the tool pressure and the tool position, judges that the welding tool 4 makes contact with the object 3. Either of the tool pressure or the tool position is selected to be used by the control means 65 for judging that the welding tool 4 makes contact with the object 3, according to the welding conditions. Further, the judgment by the control means 65 may be based on both the tool pressure and the tool position, and in this case, the contact state of the welding tool can be judged more precisely.

Figure 7:
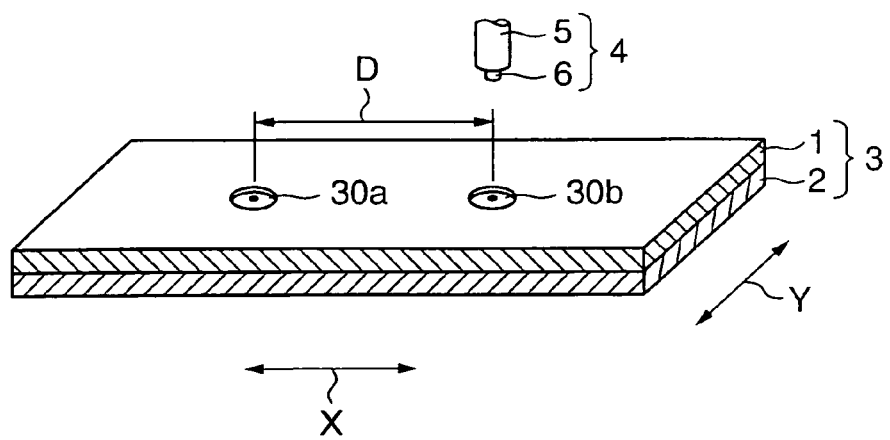
FIG. 7 is a perspective view showing welding marks formed on an object 3 by welding.

FIG. 7 is a perspective view showing welding marks 30*a* and 30*b* formed on the object 3 after welding. For example, in the object 3, at the same position in the horizontal direction Y, a plurality of target welding positions are lined up in the vertical direction X. The welding device 50 welds the members 1 and 2 at the plurality of target welding positions lined in the vertical direction X. Further, the vertical direction X and the horizontal direction Y are perpendicular to the reference axis L1. The vertical direction X and the horizontal direction Y are mutually intersected orthogonally and the horizontal direction Y is the direction in which the robot arm 63 connected to the base 55 is extended. The welding device 50 is moved sequentially to the respective target welding positions by the robot arm 63, so that a plurality of parts of the members 1 and 2 can be spot-welded.

Figure 8:
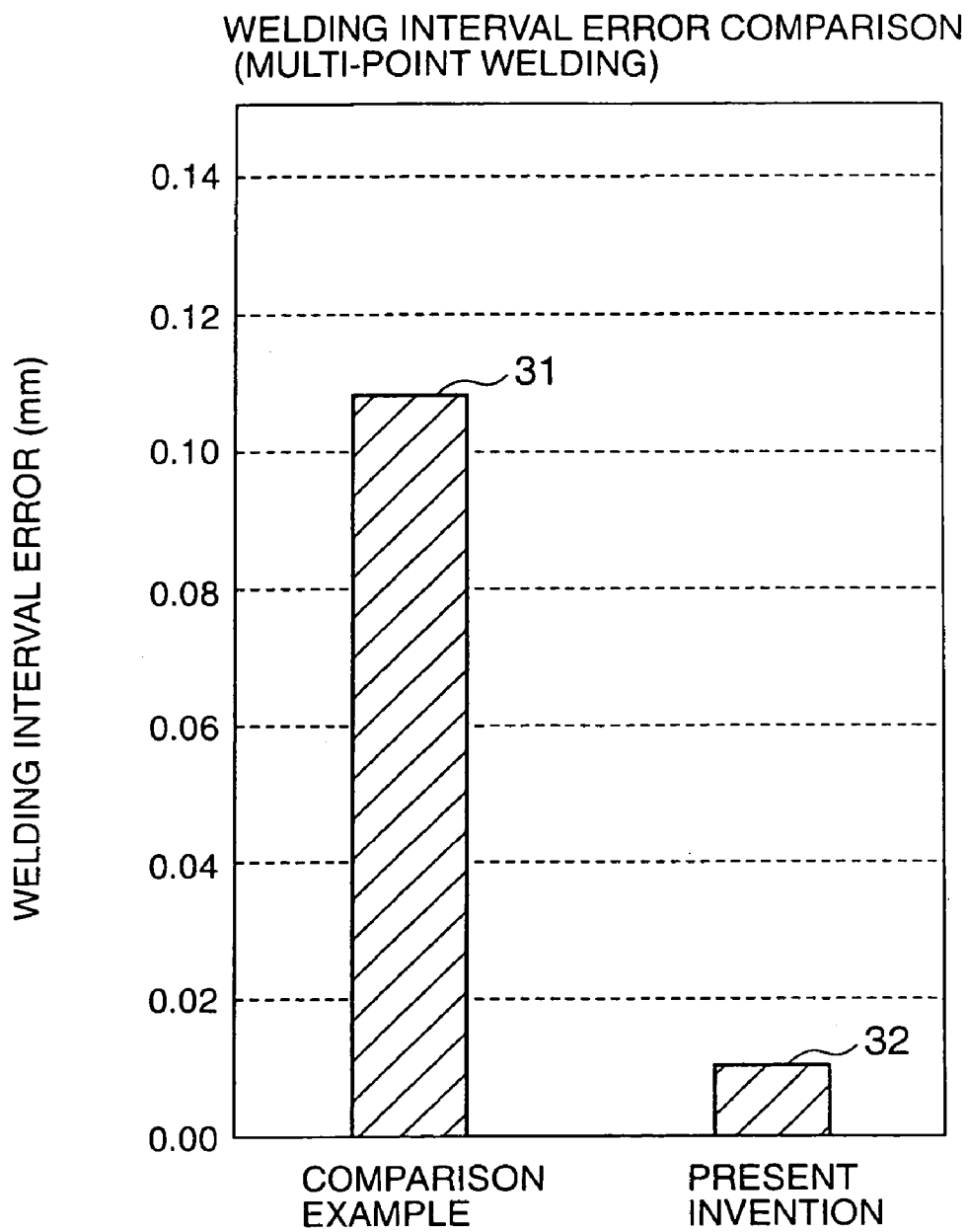
FIG. 8 is a bar graph showing welding interval errors.

FIG. 8 is a bar graph showing welding interval errors. A bar graph 31 shown in FIG. 8 shows welding interval errors in a comparison example and a bar graph 32 shown in FIG. 8 shows welding interval errors of the present embodiment. The welding interval D, as shown in FIG. 7, is the distance from the welding mark 30*a* to the welding mark 30*b*. A welding interval error indicates an error of an actual welding interval D from an ideal welding interval.

Concretely, the difference between an ideal welding interval and an actual welding interval D is expressed by an absolute value, and absolute values between welding points are averaged. For example, one example of the experimental results shows that the welding interval error 31 of the comparison example is 0.11 mm, while the welding interval error 32 in this embodiment is very small such as 0.01 mm. Namely, according to this embodiment, variations of the welding interval D can be reduced.

Figure 9:
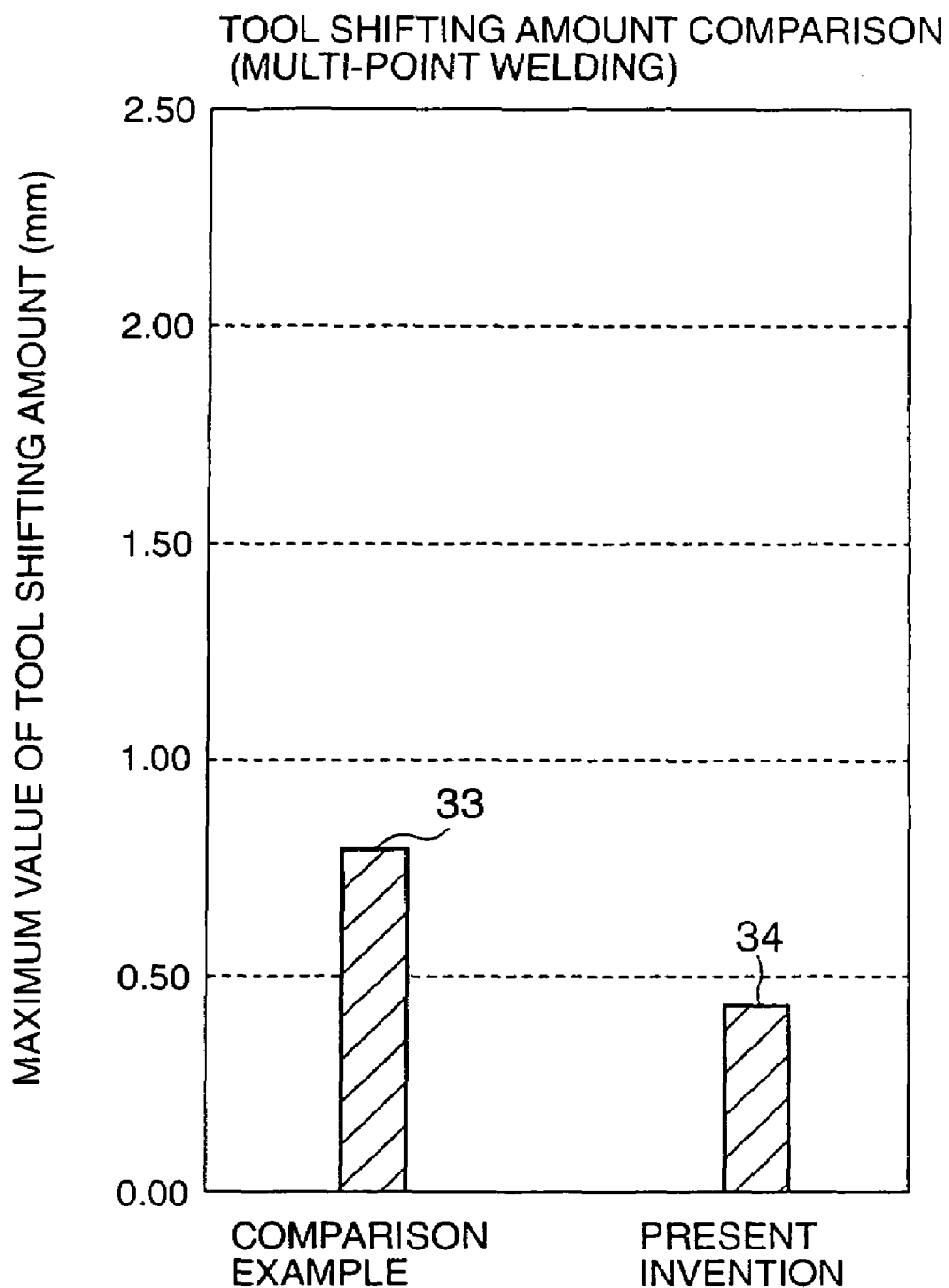
FIG. 9 is a bar graph showing shifting amounts of tools when members 1 and 2 are welded at the first target welding position among a plurality of target welding positions.

FIG. 9 is a bar graph showing the shifting amount of the tool at the first welding when the members 1 and 2 are welded at the first target welding position among a plurality of target welding positions. A bar graph 33 shown in FIG. 9 indicates the maximum value of the shifting amount E of the tool in the comparison example and a bar graph 34 shown in FIG. 9 indicates the maximum value of the shifting amount E of the tool in this embodiment. In this case, the tool shifting amount E is expressed by the following formula.

$$E=\sqrt{(\Delta X)^2+(\Delta Y)^2}$$

In the above formula, ΔX indicates a value obtained by subtracting the position of the welding tool 4 during the welding operation from the target welding position in the vertical direction X, and ΔY indicates a value obtained by subtracting the position of the welding tool 4 during the welding operation from the target welding position in the horizontal direction Y.

For example, one example of the experimental results shows that the maximum value of the shifting amount E of the tool at the first welding in the comparison example is 0.84 mm, while the maximum value of the shifting amount E of the tool in this embodiment is 0.44 mm. Namely, according to this embodiment, the tool shifting amount at the first welding can be reduced.

Figure 10:
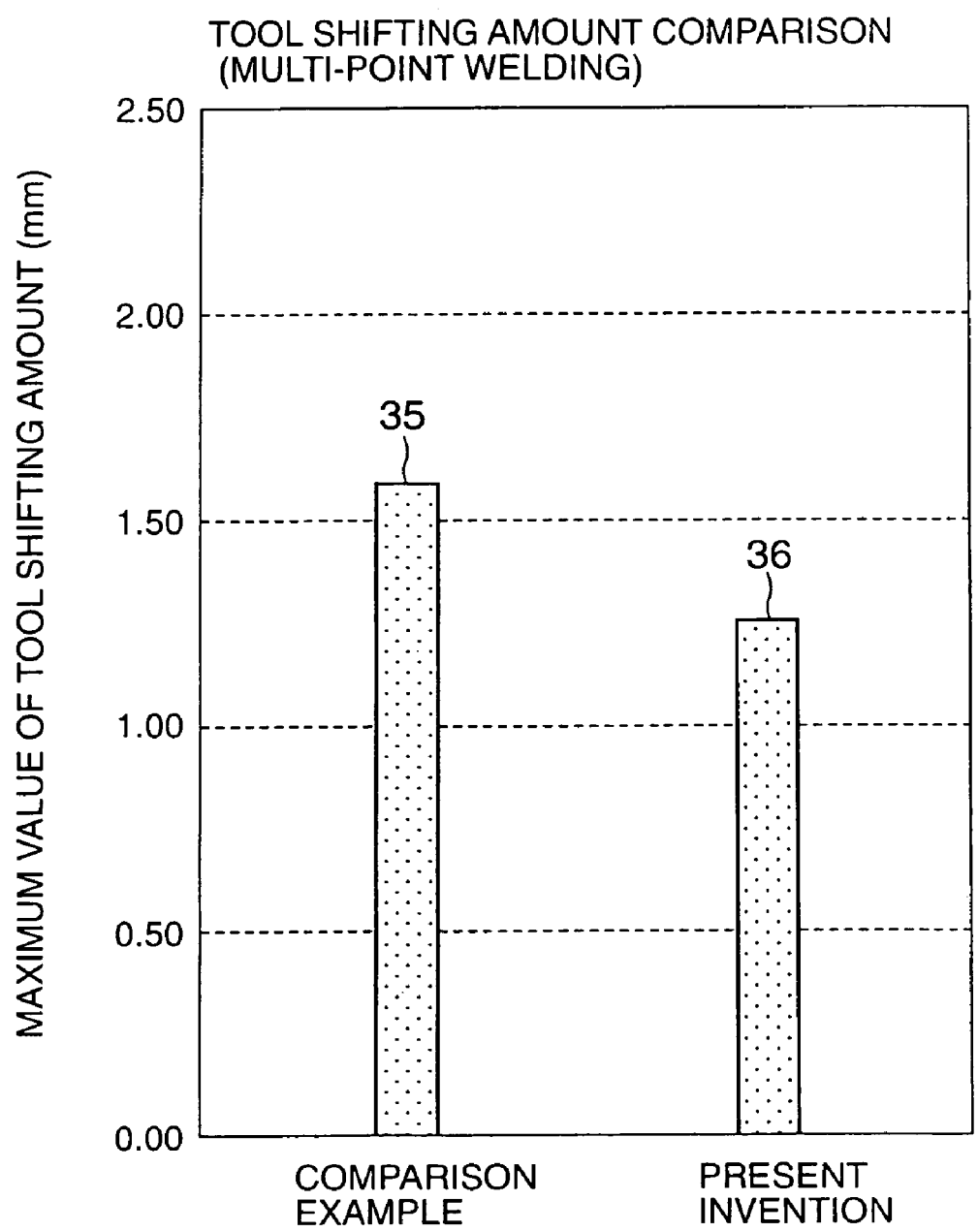
FIG. 10 is a bar graph showing shifting amounts of tools when the members 1 and 2 are welded at a target welding position other than the first one among a plurality of target welding positions.

FIG. 10 is a bar graph showing the shifting amount of the tool when the members 1 and 2 are welded at a target welding position other than the first one, i.e., the second one or later, among a plurality of target welding positions. A bar graph 35 shown in FIG. 10 indicates the maximum value of the shifting amount E of the tool in the comparison example and a bar graph 36 shown in FIG. 10 indicates the maximum value of the shifting amount E of the tool in this embodiment.

After the second welding, by an effect of the welding tool 4 inserted into the object 3 previously, the surface of the object 3 is curved. Therefore, when the welding tool 4 is inserted in the neighborhood of the first welding mark 30a, the shifting amount of the tool becomes larger than that of the first welding.

For example, an example of the experimental results shows that the maximum value of the tool shifting amount E in the comparison example after the second welding is 1.60 mm, while the maximum value of the tool shifting amount E in this embodiment is 1.27 mm. Namely, according to this embodiment, the tool shifting amount after the second welding can be reduced.

Figure 11:
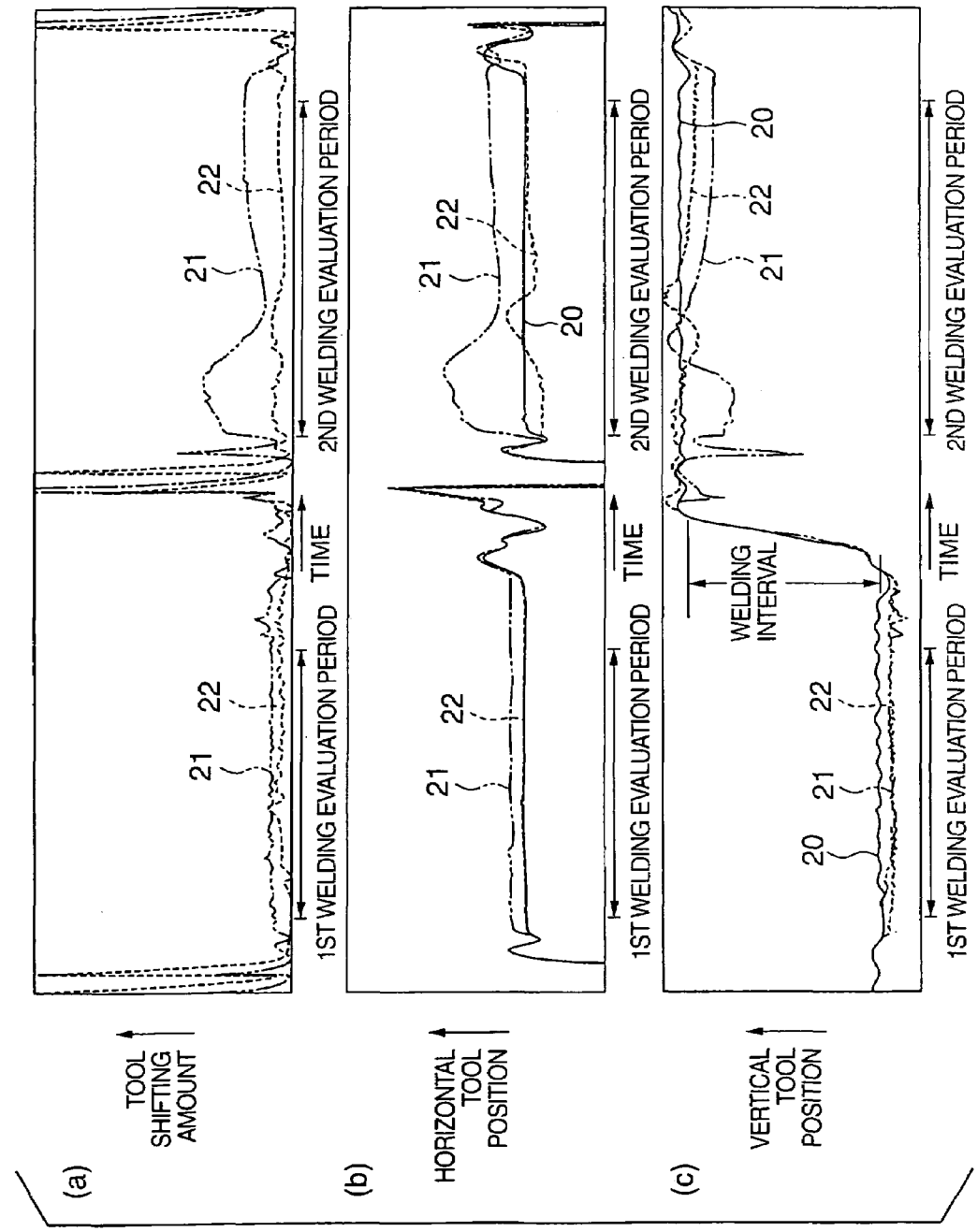
FIG. 11 is graphs showing changes with time of tool shifting amounts and tool positions of welding tools.

FIG. 11 is graphs showing changes with time of the tool shifting amount E of the welding tool 4 and the tool position. FIG. 11(a) shows changes with time of the tool shifting amount E, and FIG. 11(b) shows changes with time of the position of the welding tool 4 in the horizontal direction Y in the welding operation, and FIG. 11(c) shows changes with time of the position of the welding tool 4 in the vertical direction X in the welding operation. In FIG. 11, ideal changes with time of the position of the welding tool 4 are indicated by solid lines 20. Further, changes with time of the position of the welding tool 4 in this embodiment are indicated by dashed lines 22. Further, changes with time of the position of the welding tool 4 in the comparison example are indicated by alternate long and short dashed lines 21.

The first welding evaluation period which is a period during which the welding tool 4 is inserted into the first welding part and the second welding evaluation period which is a period during which the welding tool 4 is inserted into the next welding part are noticed. As shown in FIG. 11(a), the tool shifting amount E of the welding tool 4 in this embodiment is smaller than that of comparison example almost overall the first welding evaluation period and second welding evaluation period.

Further, as shown in FIG. 11(b), with respect to the position in the horizontal direction Y, in the first welding evaluation period in this embodiment, the welding tool 4 can be inserted in almost the same position as the target welding position. However, with respect to the position in the horizontal direction Y in the comparison example, the welding tool 4 makes contact with the object during whirling, so that the welding tool 4 is inserted into a position shifted from the target welding position. In such an experimental example, the rigidity of the robot arm 63 in the direction Y is higher than the rigidity in the direction X, so that the difference between the comparison example and this embodiment appears remarkably.

Further, when the welding tool 4 is inserted, at the second welding, the surface of the object 3 is curved. In this case, when the welding tool 4, at the second welding, is inserted in a position in the neighborhood of the position at the first welding, in the comparison example, the welding tool 4 slides along the curve of the object 3 and is inserted in a position shifted from the target welding position. However, in this embodiment, since the welding tool 4 is not rotated, the shift amount of the welding tool 4 can be reduced in comparison to the comparison example.

As shown in FIG. 11(c), with respect to the position in the vertical direction X, in the first welding evaluation period, the position may be shifted almost in the same way as with the comparison example. The reason is that the rigidity of the robot arm 63 used in the experimental example is smaller than that in the horizontal direction Y. However, when the welding tool is inserted in the rotation stopped state, after the second welding, in this embodiment, the welding tool 4 does not slide along the curve of the object 3 and the shift amount of the welding tool 4 can be reduced in comparison to the comparison example.

As mentioned above, even when a plurality of parts of the members 1 and 2 are to be sequentially spot-welded, the welding tool 4 does not whirl, so that it can be inserted precisely in the target welding position. By doing this, as shown in FIG. 8, the insertion position interval of the welding tool 4 can be prevented from variations. Therefore, the welding strength can be prevented from variations and a uniform welding strength can be realized. Further, as shown in FIGS. 9 and 10, the tool shifting amount E can be reduced regardless of the first welding and second welding. By doing this, the friction stir welding in this embodiment can be preferably used as sport welding.

Further, when the welding tool 4 is to be inserted, as the second welding, in a position in the neighborhood of the first welding mark 30a, the shifting amount E of the welding tool 4 can be reduced. By doing this, even if the welding interval D is made smaller in order to improve the welding strength, the welding strength can be prevented from variations and the welding quality can be improved.

Figure 12:
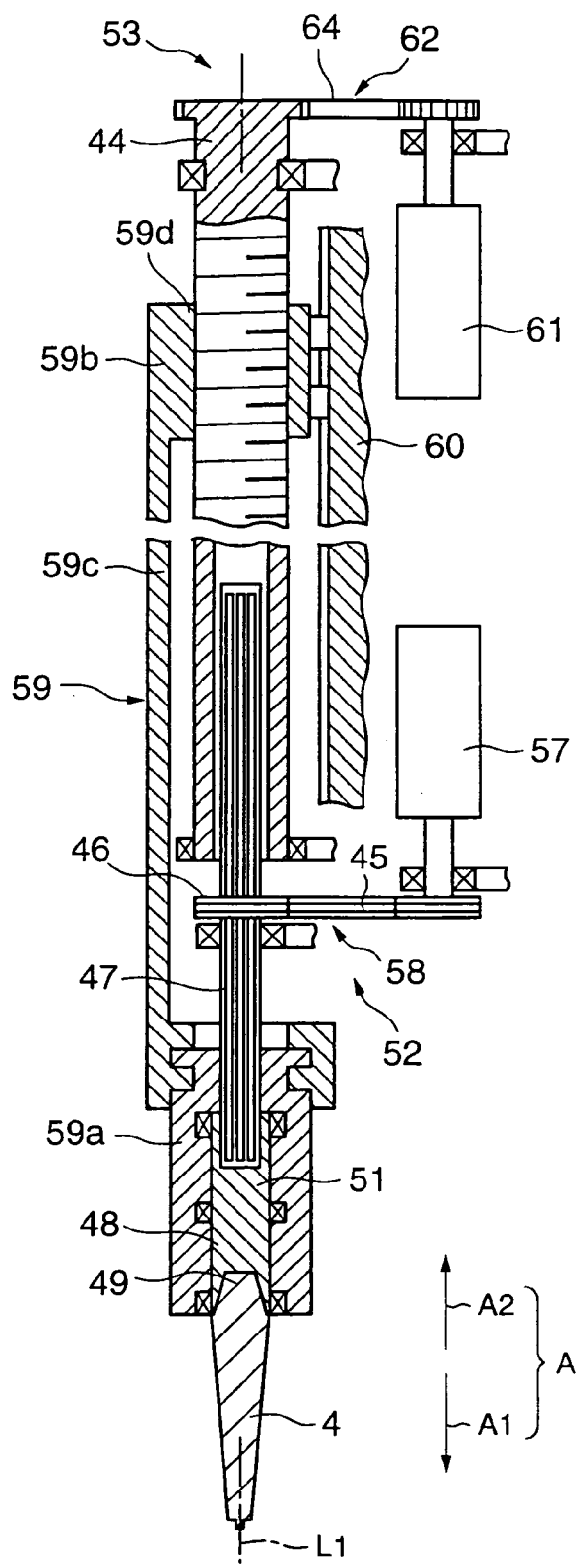
FIG. 12 is a partial sectional view showing the welding device 50 which is enlarged.

FIG. 12 is a sectional partial view showing the welding device 50 which is enlarged. An example of a concrete constitution of the welding device 50 will be explained below. The tool holding part 51 holds removably the welding tool 4. The tool holding part 51 is installed rotatably about the reference axis L1 and installed movably along the reference axis L1. The tool holding part 51 is supported rotatably by a holding part 59a of a movable part 59 which will be described later.

The tool holding part 51 is formed almost in a cylindrical shape and is installed coaxially with the reference axis. The tool holding part 51 has an outer spline 47 extending in parallel with the reference direction A on the outer peripheral part. Therefore, the tool holding part 51 is formed as a spline shaft. Further, the tool holding part 51 holds an end 49 of the welding tool 4 on the side of the second direction A2 of the axis direction at an end 48 thereof on the side of the first direction A1 of the reference direction. By doing this, the welding tool 4 moves and rotates together with the tool holding part 51.

The rotation driving means 52 has s rotation support part 56, a rotation motor 57, and a rotation transfer part 58. The rotation motor 57 is a driving source for rotating the tool holding part 51 about the reference axis L1. The rotation motor 57 is realized by a servo motor. The rotation motor 57 rotates at a predetermined revolution speed, so that a supplied current is feedback-controlled.

In the rotation transfer part 58, a spline support 46 into which the outer spline 47 of the tool holding part 51 is fit is installed. The spline support 46, in the state that movement of the tool holding part 51 in the reference direction A is permitted, rotates integrally with the tool holding part 51. Further, the rotation transfer part 58 has a belt rotation transfer mechanism 45 for transferring rotation force from the rotation motor 57 to the spline support 46.

When the rotation motor 57 rotates, the rotation force is transferred by the rotation transfer part 58 and the spline support 46 rotates about the reference axis L1. The spline support 46 is fit into the outer spline 47 of the tool holding part 51, so that the tool holding part 51 and the welding tool 4 rotate together with the spline support 46.

The movement driving means 53 has the movable part 59, a movement support part 60, a movement motor 61, and a movement transfer part 62. The support part 60 supports the movable part 59 movably in the reference direction A. The movement motor 61 is a driving source for moving the holding tool 51 in the reference axis L1. The movement motor 61 is realized by a servo motor. The movement motor 61 rotates at a predetermined revolution speed, so that a supplied current is feedback-controlled.

In the movement transfer part 62, a ball screw shaft 44 extending coaxially with the reference axis L1 is installed. The ball screw shaft 44 is screwed into a ball screw support part 59d installed on the movable part 58 to realize a ball screw mechanism. Further, the movement transfer part 62 has the belt rotation transfer mechanism 64 for transferring the rotation force from the movement motor 61 to the ball screw shaft 44.

The movable part 59 includes the holding part 59a, a guide part 59b, the ball screw support part 59d, and a connection part 59c. The holding part 59a supports the tool holding part 51 rotatably about the reference axis L1. The guide part 59b is guided by the support part 60 and is prevented from moving in any direction other than the reference direction A. For example, either of the support part 60 and the guide part 58 is a rail, and the other is a slide rail to be fit into the rail, so that the rail and slide rail realize a slide movement mechanism. Further, the connection part 59c integrally connects the guide part 59b, the holding part 59a, and the ball screw support part 59d.

When the movement motor 61 rotates, the rotation force is transferred by the movement transfer part 62 and the ball screw shaft 44 is rotated about the reference axis L1. The ball screw shaft 44 is screwed into the ball screw support part 59d of the movable part 59 and the movable part 59 moves in the reference direction A while the ball screw shaft 44 is rotated. The tool holding part 51 is supported by the movable part 59, so that it moves in the reference direction A together with the movable part 59.

By use of such a constitution, the welding device 50 drives each motor, thereby can drive the rotation of the mounted welding tool 4 and also drive the movement of the same in the reference direction A. The welding device 50, by the ball screw mechanism, converts the rotation force from the movement motor 61 to straight movement force for driving the movement of the welding tool 4, thus even if the welding tool 4 is instantaneously applied with large reaction force from the object, the movement motor 61 is prevented from transfer of the reaction force.

Further, the aforementioned constitution of the welding device 50 is one embodiment of the present invention. Accordingly, rotation driving and movement driving of the welding tool 4 may be realized by other constitutions.

The aforementioned embodiment of the present invention is one embodiment of the present invention and within the range of the present invention, the constitution can be changed. For example, in the above-mentioned embodiment, the pressure detection means 71 detects a current of the servo motor in proportion to the tool pressure. However, it may be other means. For example, it may be a load cell for measuring the tool pressure. In this case, the load cell is installed on the support 54 and when pressure higher than a predetermined pressure is applied, it decides that the welding tool 4 makes contact with the object 3 and gives the decision result to the control means. Further, the tool position detection means 70 may be realized by a movement sensor. Further, the control means 65 may be installed separately from the robot controller. In this case, upon receipt of a welding start instruction from the robot controller, the control means 65 starts the welding operation. Further, in the above-mentioned embodiment, the members 1 and 2 are made of an aluminum alloy. However, it is not limited to an aluminum alloy as long as the material is softer than that of the welding tool. Further, two or more members to be welded may be stacked.

Although the invention has been described in its preferred embodiment with a certain degree of particularity, obviously many changes and variations are possible therein. It is therefore to be understood that the present invention may be practiced otherwise than as specifically described herein without departing from the scope and spirit thereof.

What is claimed is:

1. A friction stir welding method of welding an object composed of a plurality of members to be welded by stirring the object in a solid phase using a welding tool, comprising:
   an insertion step of moving the welding tool in a reference direction coinciding with an axis of the welding tool in a rotation-stopped state so as to insert the welding tool into the object and form a concavity in the object, the object being supported by a support and the welding tool being inserted into the object on a surface opposite the support; and
   a stirring step of rotating the welding tool about the axis of the welding tool after the insertion step so as to stir the object in a solid phase by frictional heat between the welding tool and the object, thereby welding the members.

2. A friction stir welding method according to claim 1, further comprising a pull-out step of moving the welding tool in the reference direction in the rotation-stopped state so as to separate the welding tool from the object.

3. A friction stir welding method according to claim 1, wherein a plurality of parts of the members to be welded are sequentially spot-welded.

4. A friction stir welding method according to claim 1, wherein a plurality of parts of the members to be welded are sequentially spot-welded.

5. A friction stir welding method according to claim 1, wherein in the insertion step, it is judged that the welding tool makes contact with the object when a pressure applied to the object by the welding tool becomes larger than a predetermined pressure and/or when a position of the welding tool reaches a predetermined position coinciding with a surface of the object.

6. A friction stir welding method according to claim 5, wherein the stirring step starts rotating of the welding tool when a predetermined time elapses after the welding tool makes contact with the object and/or when the welding tool moves by a predetermined distance after making contact with the object.

* * * * *